US011248487B2

(12) United States Patent
Delaitre et al.

(10) Patent No.: US 11,248,487 B2
(45) Date of Patent: Feb. 15, 2022

(54) TURBOMACHINE INCLUDING A COOLING AND TURBINE CLEARANCE CONTROL SYSTEM HAVING AN AIR SUPPLY SCOOP

(71) Applicant: SAFRAN AIRCRAFT ENGINES, Paris (FR)

(72) Inventors: Pascal Xavier Delaitre, Evry (FR); Thierry Kohn, Les Pavillons Sous Bois (FR); Bruna Manuela Ramos, Seine Port (FR); Florian Benjamin Kévin Lacroix, Moissy-Cramayel (FR); Antonin Etienne Diego Tessiereau, Veneux les Sablons (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 24 days.

(21) Appl. No.: 16/001,882

(22) Filed: Jun. 6, 2018

(65) Prior Publication Data
US 2018/0355748 A1    Dec. 13, 2018

(30) Foreign Application Priority Data

Jun. 7, 2017 (FR) ...................................... 1755065

(51) Int. Cl.
*F01D 11/24* (2006.01)
*F01D 9/06* (2006.01)
(Continued)

(52) U.S. Cl.
CPC .............. *F01D 11/24* (2013.01); *F01D 9/065* (2013.01); *F01D 17/145* (2013.01);
(Continued)

(58) Field of Classification Search
CPC ........ F01D 11/24; F01D 9/065; F01D 17/145; F01D 17/148; F01D 25/162;
(Continued)

(56) References Cited

U.S. PATENT DOCUMENTS 8,398,016 B2 * 3/2013 Porte ...................... B64D 33/08
244/53 B
8,464,688 B2 * 6/2013 Kurita .................. F02D 9/1065
123/337

(Continued)

FOREIGN PATENT DOCUMENTS

EP     3 388 648 A1   10/2018
FR     3 021 994 A    12/2015
(Continued)

OTHER PUBLICATIONS

French Search Report dated Feb. 14, 2018, issued in French Application No. 1755065, filed Jun. 7, 2017, 6 pages.
(Continued)

*Primary Examiner* — Woody A Lee, Jr.
*Assistant Examiner* — Jesse M Prager
(74) *Attorney, Agent, or Firm* — Christensen O'Connor Johnson Kindness PLLC (57) ABSTRACT

A dual-flow turbomachine generally includes a cooling and turbine clearance control system located in a primary air flow path of the turbomachine, supplied a scoop configured to take air from a secondary air flow path arranged around the primary air flow path through an air inlet of the scoop, where the scoop may further include one wall configured to be arranged in the extension of a wall of the secondary flow path, and further where the air inlet may be formed in and flush with the wall.

6 Claims, 6 Drawing Sheets

(51) Int. Cl.
 *F01D 25/16* (2006.01)
 *F01D 17/14* (2006.01)
 *F02K 3/06* (2006.01)

(52) U.S. Cl.
 CPC ......... *F01D 17/148* (2013.01); *F01D 25/162* (2013.01); *F02K 3/06* (2013.01); *F05D 2220/32* (2013.01); *F05D 2240/12* (2013.01); *F05D 2240/14* (2013.01); *F05D 2250/51* (2013.01); *F05D 2260/20* (2013.01); *F05D 2260/38* (2013.01)

(58) Field of Classification Search
 CPC ............. F05D 2260/38; F05D 2220/32; F05D 2240/12; F05D 2240/14; F05D 2250/51; F05D 2260/20; F02K 3/06
 See application file for complete search history.

(56) References Cited

U.S. PATENT DOCUMENTS

| | | | |
|---|---|---|---|
| 2002/0005038 A1 | 1/2002 | Boeck | |
| 2003/0233834 A1 | 12/2003 | Boeck | |
| 2009/0094989 A1 | 4/2009 | Kraft et al. | |
| 2009/0111370 A1* | 4/2009 | Porte | B64D 33/08 454/76 |
| 2010/0050700 A1 | 3/2010 | Bongini | |
| 2010/0150700 A1* | 6/2010 | Strecker | F01D 9/065 415/116 |
| 2010/0215481 A1 | 8/2010 | Negulescu et al. | |
| 2010/0223905 A1 | 9/2010 | Todorovic et al. | |
| 2010/0247297 A1* | 9/2010 | Legare | F01D 11/24 415/173.1 |
| 2016/0138471 A1* | 5/2016 | Van Der Woude | F02K 3/115 415/144 |
| 2016/0153309 A1* | 6/2016 | Clairet | F01D 9/06 415/116 |

FOREIGN PATENT DOCUMENTS

| | | | | |
|---|---|---|---|---|
| FR | 3 021 994 A1 | | 12/2015 | |
| FR | 3 025 843 A1 | | 3/2016 | |
| FR | 3025843 A1 | * | 3/2016 | ............. F01D 9/065 |
| FR | 3 029 171 A1 | | 6/2016 | |
| WO | 92/11444 A1 | | 7/1992 | |

OTHER PUBLICATIONS

UK Search Report dated Nov. 23, 2018, issued in corresponding Application No. GB1808583.7, filed May 24, 2018, 4 pages.

* cited by examiner

TURBOMACHINE INCLUDING A COOLING AND TURBINE CLEARANCE CONTROL SYSTEM HAVING AN AIR SUPPLY SCOOP

BACKGROUND

A turbomachine for an aircraft generally includes, from upstream to downstream following the gas flow direction, a ducted fan, one or several compressor stages, for example an LP low pressure compressor and an HP high pressure compressor, a combustion chamber, one or several turbine stages, for example an HP high pressure turbine and an LP low pressure turbine and a gas exhaust pipe. Each compressor can be associated with a turbine, both being linked to a shaft and together forming, for example, an HP high pressure body and an LP low pressure body.

The compressor rotors contain blades that respectively compress the air before it is introduced in the combustion chamber. Similarly, turbine rotors comprise blades that are driven by the combustion gases produced by the combustion chamber in order to rotationally drive the rotors. All the rotors are mounted rotationally in annular casings that are assembled axially in succession so as to form a global casing for the primary flow of the turbomachine.

Specifically, these annular casings surrounding the turbine rotors, due to the high temperature of the gases coming from the combustion chamber, are subject to significant heating phenomena that tend to increase the operating clearances between the ends of the turbine blades and the casings, thereby reducing the performance of the turbomachine. When a turbine casing expands, the combustion gases are able to infiltrate between the ends of the blades and the casing. The efficacy of the turbine under consideration is therefore reduced.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, the present disclosure aims to remedy certain drawbacks of conventional systems by proposing a dual-flow turbomachine that includes an ACC system to control the clearances of a dual-flow turbomachine turbine, whereby the turbomachine includes a scoop that does not disrupt the air flow in the secondary flow path.

For this purpose, embodiments of the present disclosure propose a dual-flow turbomachine that includes a secondary air flow path that surrounds a primary air flow path, a cooling and turbine clearance control system of the turbomachine located in the primary air flow path, and an air inlet scoop of the system, configured to take air in the secondary air flow path through an air inlet of the scoop, where the air inlet scoop may include a wall that is configured to be arranged in the extension of a wall of the secondary flow path and in that the air inlet is formed in the wall and is flush with the wall.

According to one or more aspects of the disclosure, the turbomachine may include one or more of the following in any combination:

the scoop may include a duct connecting the air inlet to the outlet of the scoop, formed in a base configured to allow connecting the scoop to the cooling and clearance control system, and an air flow control shutter located inside the duct, in the vicinity of the air inlet;

the shutter may be assembled in the inlet duct and can move from a minimum flow position, in which the shutter may create the biggest obstruction in a plane that is transverse to the cross section of the duct, and a maximum flow position, in which the shutter creates the smallest obstruction in the plane that is transverse to the cross section of the duct;

the shutter may include an area that is smaller than the surface of the cross section of the duct in a plane that is transverse to the cross section of the duct, thereby defining a non-zero minimum flow that is called leakage rate;

the shutter may be mounted on a swiveling axis that is transverse to the direction of the duct, and that is elastically returned to its minimum flow position by an elastic return inserted between a body of the scoop, in which the duct and the axis of the shutter are formed;

the axis may include a radial lead finger and the body includes, in a plane that is transverse to the axis of the shutter and passing through the radial finger, two adjustable stops designed to stop the finger, thereby defining two extreme angular positions of the axis, associated with the minimum flow and maximum flow positions of the shutter;

the scoop may contain a rotating actuator coupled to the axis of the shutter;

the body may contain a housing that opens in the duct and houses the shutter, the axis of which passes through a wall of the housing and the elastic return, the radial finger, the adjustable stops and the actuator are arranged outside the housing;

the turbomachine may be oriented along an axis A and comprises a secondary air flow path that is externally delineated, in the general flow direction of the air, from upstream to downstream along the axis, by an outer shroud of an intermediary annular casing that supports the casing of the ducted fan and an annular external and/or a guiding nacelle of the secondary flow assembled to the outer shroud, and internally delineated, in the general flow direction of the air, from upstream to downstream along the axis, by an inner shroud of the intermediary annular casing and an annular internal casing for the secondary flow, assembled to the inner shroud, whereby the intermediary annular casing comprises radial arms connecting at least the outer and inner shrouds and the turbomachine, and wherein, nearby the arms, the wall of the scoop may be arranged in the extension of a wall of the secondary flow path;

the radial arms may include structural radial arms that connect the outer and inner shrouds of the intermediary annular casing, and the turbomachine includes an aerodynamic arm that is connected to one of the structural arms of the intermediary annular casing and that is arranged radially between the external annular casing and/or guiding nacelle of the secondary flow on one hand, and the annular internal casing of the secondary flow on the other hand, whereby the aerodynamic arm extends axially to the radial arm of the annular intermediary casing and in the axial extension of the radial arm, and whereby the aerodynamic arm includes a housing, at its junction with its structural radial arm of the intermediary casing, that houses the scoop, enabling the wall of the scoop to be oriented radially and flush with a radial wall of the structural radial arm and a wall of the aerodynamic arm; and the wall of the scoop may extend along the entire radial dimension of the aerodynamic arm and the structural radial arm.

DESCRIPTION OF THE DRAWINGS

The foregoing aspects and many of the attendant advantages of the present disclosure will become more readily appreciated as the same become better understood by reference to the following detailed description, when taken in conjunction with the accompanying drawings, wherein.

DETAILED DESCRIPTION

The detailed description set forth below in connection with the appended drawings are intended as a description of various embodiments of the present disclosure and are not intended to represent the only embodiments. Each embodiment described in this disclosure is provided merely as an example or illustration and should not be construed as precluding other embodiments. The illustrative examples provided herein are not intended to be exhaustive or to limit the disclosure to the precise forms disclosed.

In the following description, specific details are set forth to provide a thorough understanding of exemplary embodiments of the present disclosure. It will be apparent to one skilled in the art, however, that the embodiments disclosed herein may be practiced without embodying all of the specific details. In some instances, well-known process steps have not been described in detail in order not to unnecessarily obscure various aspects of the present disclosure. Further, it will be appreciated that embodiments of the present disclosure may employ any combination of features described herein.

The present application may include references to directions, such as "forward," "rearward," "front," "rear," "upward," "downward," "top," "bottom," "right hand," "left hand," "lateral," "medial," "in," "out," "extended," etc. These references, and other similar references in the present application, are only to assist in helping describe and to understand the particular embodiment and are not intended to limit the present disclosure to these directions or locations.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

To circumvent the inefficiencies and other drawbacks of conventional systems, active turbine clearance control systems have been developed for dual-flow turbomachines; these are called ACC systems, which stands for Active Clearance Control, and come as LPTACC systems, which stands for Low Pressure Turbine Active Clearance Control, and HPTACC systems, which stands for High Pressure Turbine Active Clearance Control. These systems are designed to limit the expansion, respectively of LP low pressure turbine casings and HP high pressure turbine casings, by cooling the casings with the circulation a flow of cold air taken from the secondary flow path of the turbomachine along the walls of these casings.

The supply of cold air to such a system is generally achieved by a scoop that takes air from the secondary flow path.

When these devices include a scoop, most of the devices do not comprise sufficient air flow control means integrated in the scoop. Either the devices fail to comprise such control means, or the flow control means, which are independent from the scoop, comprise aerodynamic disadvantages owing to their location upstream and downstream from the scoop, in particular in terms of disruptions to the secondary flow.

For example, an air flow shutter located in the secondary flow path, upstream from the scoop, diverts all or part of the air flow coming into the scoop, but also disrupts the air flow upstream from the scoop. Similarly, an air flow shutter can also be arranged downstream from the scoop in the ACC system, as is the case with the shutter, but in this case it allows air into the scoop, even when such air is not required, so that the air creates a vortex flow in the vicinity of the scoop, which disrupts the secondary flow.

It may be preferable to limit the influence of aerodynamic disturbances caused by the scoop inside the secondary flow path.

Figure 1:
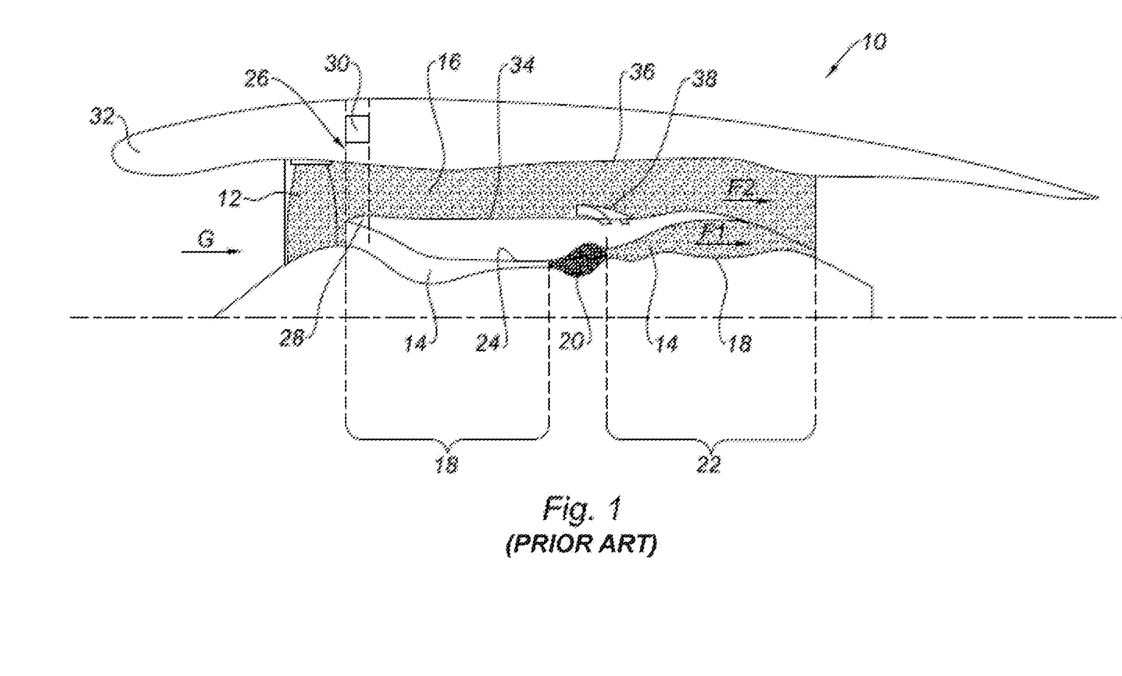
FIG. 1 is a global and schematic view of a dual-flow turbomachine that includes a scoop according to a prior art.

FIG. 1 shows a schematic representation of a turbomachine 10 according to a prior art. In a known manner, the turbomachine 10 is a dual-flow turbomachine along the axis A that includes a ducted fan 12 that supplies a primary flow path 14 and a secondary flow path 16.

The primary flow path 14 passes through one or several compressors 18, a combustion chamber 20, and one or several turbines 22. The walls of the primary flow path are, specifically, delineated by an external primary flow casing 24, formed by the assembly of external primary flow casing sections (not shown in FIG. 1), by the shrouds of the various compressors and turbines 18, 22 (not shown in FIG. 1), and by the walls of the combustion chamber 20.

Figure 3:
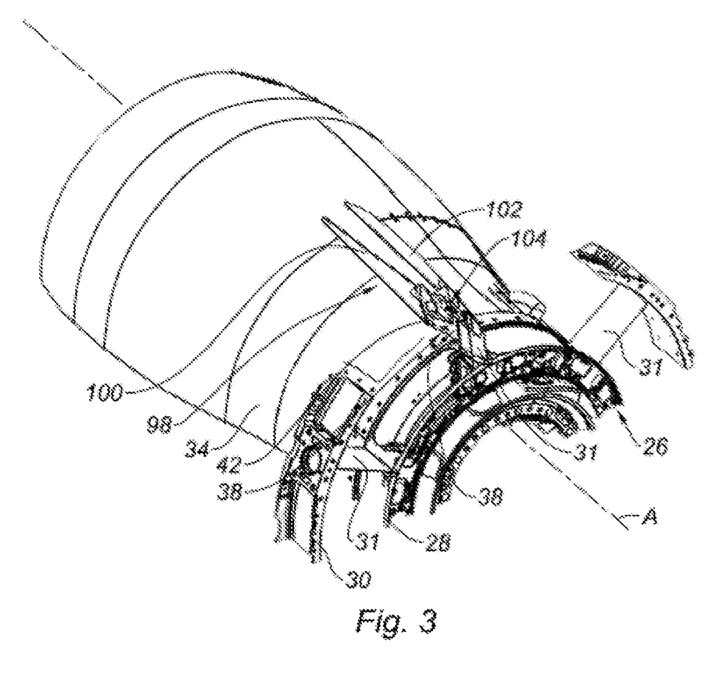
FIG. 3 is a perspective view of one representative embodiment of a front section with cutaway of an intermediary casing, an internal secondary flow casing, an aerodynamic arm, and a scoop for a turbomachine, in accordance with aspects of the present disclosure.
Figure 4:
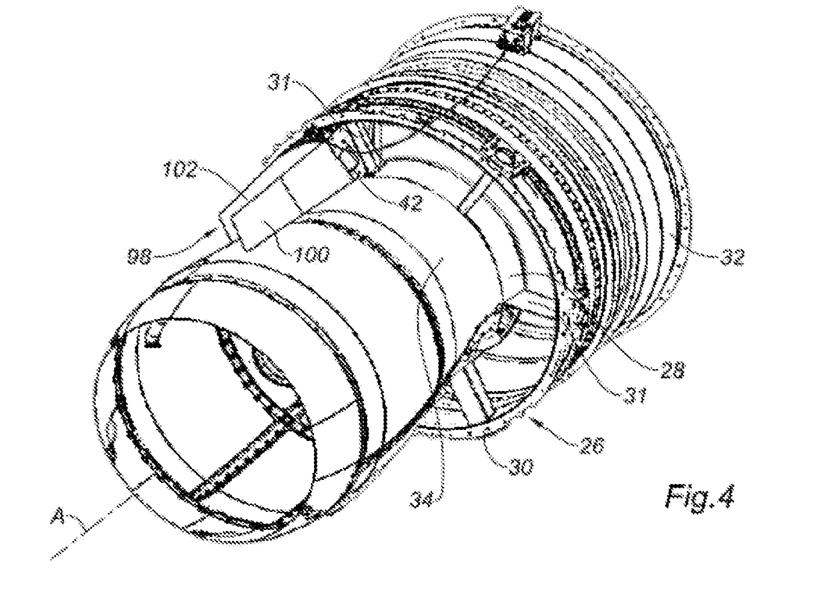
FIG. 4 is a perspective view of one representative embodiment of a rear section of an intermediary casing, an internal secondary flow casing, an aerodynamic arm, and a scoop for a turbomachine, in accordance with aspects of the present disclosure.

The turbomachine 10 includes an intermediary annular casing 26 that comprises and inner shroud 28 and an outer shroud 30 connected by structural radial arms 31, shown in FIGS. 3 and 4, upstream from which is secured, in the direction of the gas flow G, a ducted fan casing 32.

The secondary flow path 16 extends downstream from the intermediary annular casing 26 and is delineated by an internal secondary flow casing 34 and an external secondary flow casing 36 and/or a wall of a nacelle 36 that are both secured to the intermediary annular casing 26, i.e. respectively to its inner shroud 28 and to its outer shroud 30.

It should also be noted that the external primary flow casing 24 is also secured to the inner shroud 28 of the intermediary annular casing 26.

A primary flow F1 passes through the primary flow path 14 and a secondary flow F2 passes through the secondary flow path 16. These two flows are the result of the suction of the gaseous flow G by the ducted fan 12 of the turbomachine 10.

The turbomachine 10 includes a cooling and turbine clearance control system. For this purpose, the turbomachine 10 includes a scoop 38 that passes through the internal secondary flow casing 34 and that is configured to transport, through a clearance control system (not shown in FIG. 1) cooling air onto the external primary flow casing 24 arranged at a right-angle with the turbine.

Figure 2:
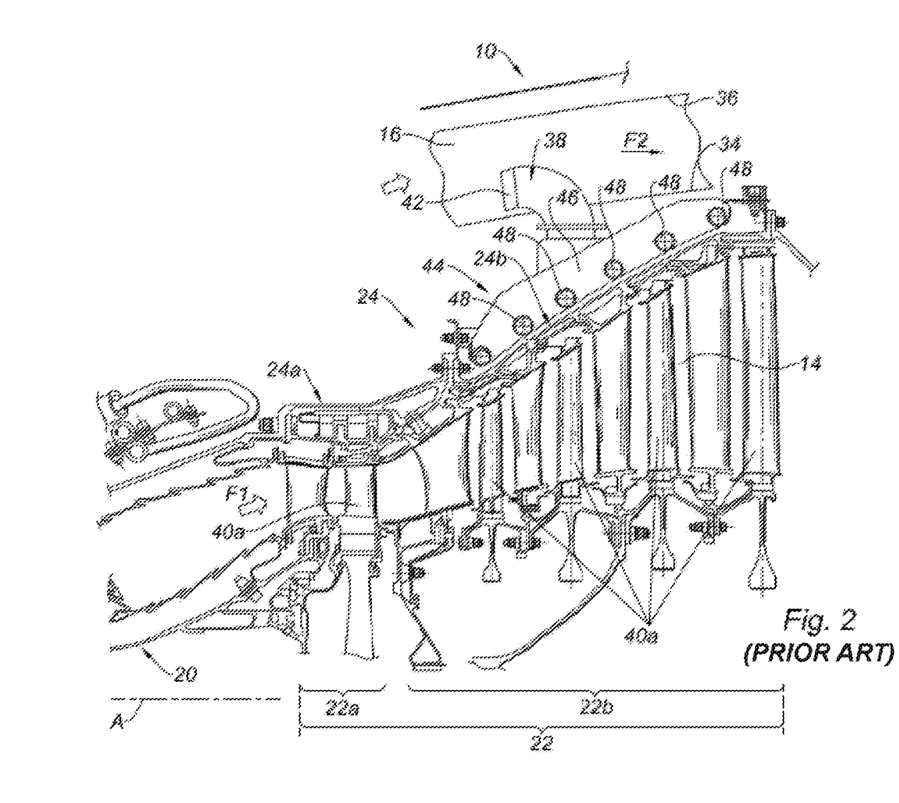
FIG. 2 is a detailed view of an axial cross section of the turbomachine in FIG. 1, in the vicinity of its scoop.

This above-noted type of configuration is shown in FIG. 2 and provided as an example. In this example, the turbomachine 10 includes a series of turbines 22 that specifically comprise one high pressure turbine 22a and one low pressure turbine 22b.

Each respective HP high pressure turbine 22a or LP low pressure turbine 22b has respective blades 40a, 40b that are rotationally mounted in the corresponding sections 24a, 24b of the external primary flow casing 24, in particular an HP high pressure turbine casing 24a and an LP low pressure turbine casing 24b.

The scoop 38 is arranged in the secondary flow path 16, in which it is substantially protruding between the internal secondary flow casing 34 and the external secondary flow casing 36. The scoop 38 includes an air inlet 42, turned towards the flow direction F2 and designed to let air into the flow path 16 and to transport the air towards a clearance control system 44 that comprises, essentially, a distributor 46 supplied in air by the scoop 38 and on which are connected several tubes 48 that surround the low pressure turbine casing 24b for the purpose of cooling it, and preventing expansion. It is therefore clear that the system shown in FIG. 2 is a Low Pressure Turbine Active Clearance Control system, or LPTACC, designed to control the clearing between the ends of the blades 40b and the casing 24b of the low pressure turbine.

The disadvantage of this design resides, as can be seen in FIG. 2, in the fact that the scoop 38 protrudes inside the flow path 16 and disrupts the flow therein. This can have an impact on the energetic and aerodynamic characteristics of the cold air flow F2, as the scoop is likely to generate a vortex flow downstream from it, and the vortex flow can cause turbulences that reduce the propulsive efficiency of the cold air flow F2.

Furthermore, another disadvantage of this design is that it generates acoustic disturbances downstream from the scoop 38, which go against the generally accepted purpose which is to achieve a turbomachine 10 that is as silent as possible. As shown, the clearance control system 44 does not include, in this design, any device to adjust the flow of air passing through the scoop 38. Consequently, the distributor 46 is continuously supplied, which results in losses of the cold air flow F2.

The following description provides several examples that relate to an improved scoop for providing air flow to the clearance control system. As shown in FIGS. 6 to 8C, a turbomachine includes a scoop 38 in accordance with an embodiment of the present disclosure. The scoop has one wall positioned within the secondary flow path 16 of or configured to be arranged in the extension of a wall of the secondary flow path 16 and with an air inlet 42 formed in the wall 50 and flush with the wall 50.

Figure 6:
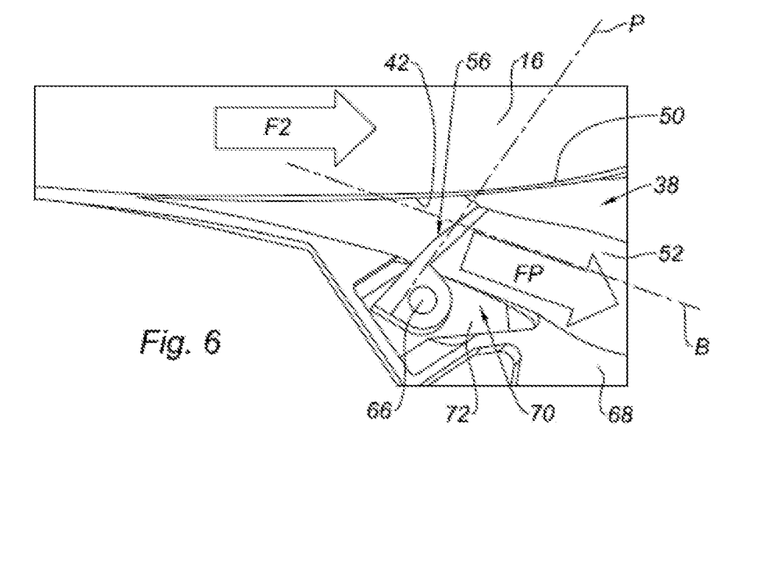
FIG. 6 is a cross section view of the scoop of FIG. 5, showing an area in the vicinity of its air inlet and adjustment shutter.

As shown in FIG. 6, in some embodiments, the scoop 38 is arranged in the extension of the entire wall of the secondary flow path 16, close to the internal secondary flow annular casing 34. Therefore, according to a first embodiment (not shown), the wall 50 can be arranged in the extension of the internal secondary flow annular casing 34.

Figure 5:
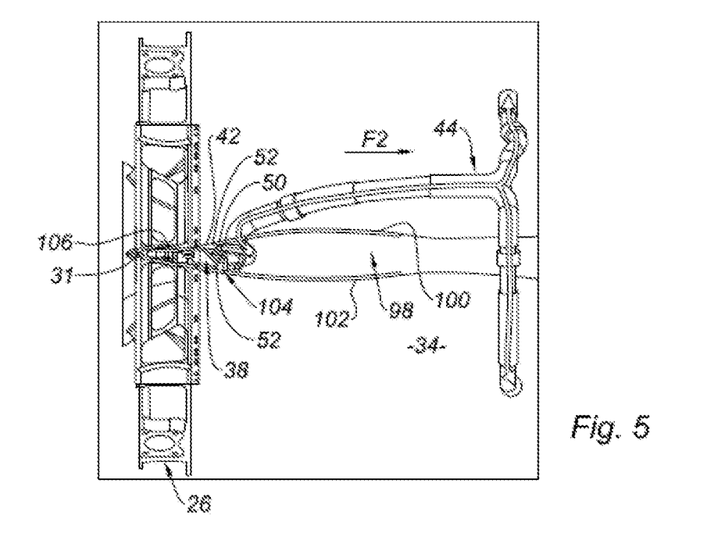
FIG. 5 is a schematic and perspective view of one representative embodiment of the present disclosure showing the connection of the scoop to a turbine clearance control circuit.

However, as will be demonstrated in this description in reference to FIGS. 3 to 5, in some embodiments, the scoop 38 is suitably arranged in the extension of at least one radial strip placed in the secondary air flow F2 inside the flow path 16.

Figure 8A:
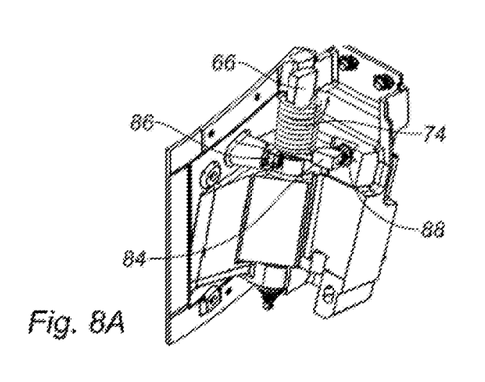
FIGS. 8A to 8D are perspective views of the scoop of FIG. 5.
Figure 8B:
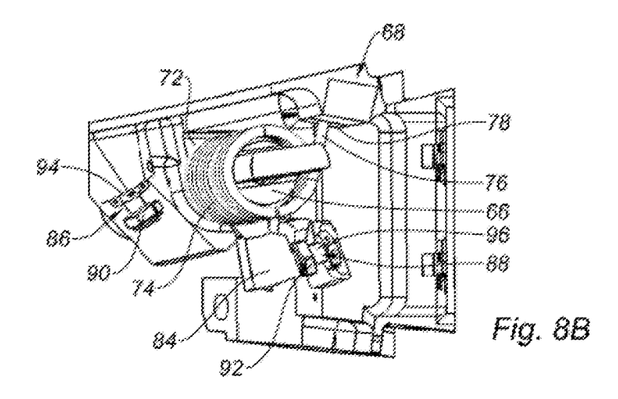
Figure 8C:
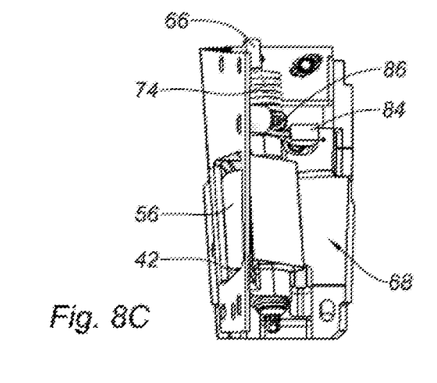
Figure 8D:
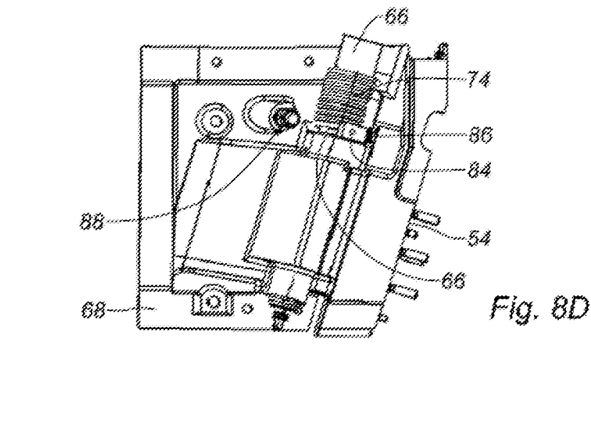

In the illustrated embodiment of FIG. 6, the scoop 38 includes at least one duct 52 connecting the air inlet 42 to an outlet formed in the base 54 of the scoop, shown in FIG. 8D, configured to connect the scoop 38 to the cooling and clearance control system 44, as shown in FIG. 5. This duct 52 transports the inlet FP air flow to the cooling and clearance control system 44.

Turning to FIG. 5, it will be noticed that the duct 52 extends in a single direction, and that the base 54 is arranged around the outlet of the duct, opposite the air inlet 42, but it should be understood that this configuration is in no way limiting and that the duct 52 could follow various directions in succession, so as to allow the base 54 to be arranged, for example, in a perpendicular direction or at a right angle to the direction of the air inlet 42.

Figure 7:
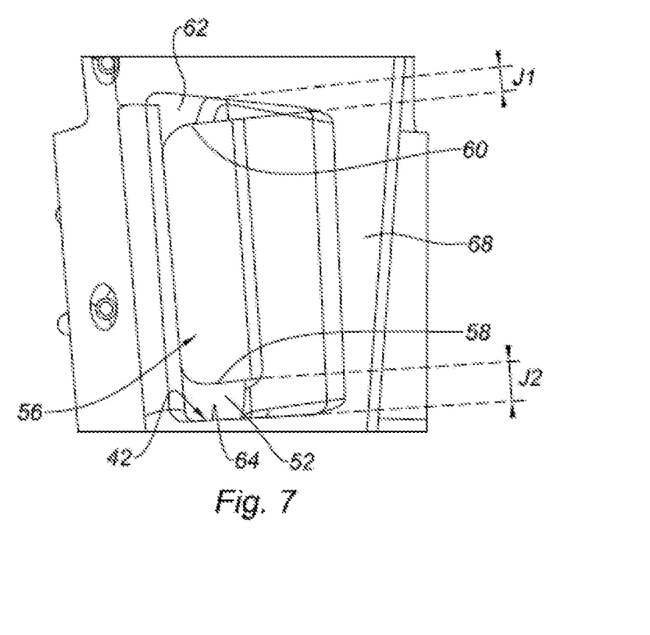
FIG. 7 is a perspective view of the air inlet of the scoop of FIG. 5.

In some embodiments of the present disclosure, and as shown in FIGS. 6, 7, and 8C, the turbomachine 10 is particularly advantageous in that its scoop 38 comprises an air flow control shutter 56 that is located inside the duct 52, in the vicinity of the air inlet 42.

Compared with the clearance control device according to FIGS. 1 and 2, this configuration is particularly advantageous in that it does not require the inclusion of a deflector in the cold air flow F2 upstream from scoop 38, which limits the disruptions caused by the shutter 56. Furthermore, the proximity of the shutter 56 to the air inlet 42 prevents a significant inlet air flow to penetrate in the scoop 38 when the scoop is not being used, which avoids load losses in the secondary cold air flow F2, and thereby avoids disruptions that could result therefrom.

Advantageously, as shown in FIG. 6, the shutter 56 is assembled in the inlet duct 52 so as to be movable from a minimum flow position, in which the shutter 56 creates the biggest obstruction in a plane P that is transverse to the cross section of the duct 52, to a maximum flow position, in which the shutter 56 creates the smallest obstruction in the plane P that is transverse to the cross section of the duct.

The maximum obstruction position associated with the minimal flow position of the shutter 56, and the minimum obstruction position associated with the maximum flow position of the shutter 56 are both included between two extreme mechanical positions, specifically a closed position where the shutter 56 extends along the entire transverse dimension of the duct 52, as shown in FIG. 6, or a fully open position where the shutter 56 is retracted in the extension of the duct 52, as shown by dotted lines in FIG. 6. However, as will be seen below, the maximum obstruction position associated with the minimum flow position and the minimum obstruction position associated with the maximum flow position do not necessarily correspond to these fully closed or fully open positions but, as will be described herein, are included between these two positions.

In one illustrated embodiment of the present disclosure, as seen in FIGS. 7 and 8C, the shutter 56 comprises an area that is smaller than the surface of the cross section of the duct 52 in a plane P that is transverse to the cross section of the duct 52, thereby defining a non-zero minimum flow that is called leakage rate. This smaller surface of the shutter 56 is achieved, for example, by proposing a shutter 56 with dimensions that are smaller than that of the duct 52, whereby the shutter 56 comprises, in one embodiment, clearances J1 and J2 between its edges 58, 60 and the adjacent walls 62, 64 of the duct 52.

It should be made clear that this leakage rate can be achieved in any other manner, for example by holes in the surface of the shutter 56.

Switching the shutter 56 from its minimum flow position to its maximum flow position and inversely can be achieved by any means known to the state of the art. Specifically, the shutter 56 can be a sliding shutter, protruding inside the duct 52 from a slot in the duct 52.

However, in another embodiment of the present disclosure, the shutter 56 is mounted on a swiveling axis 66 that is transverse to the direction B of the duct 52, and that is elastically returned to its minimum flow position by an elastic return inserted between a body 68 of the scoop 38, in which the duct 52 is formed, and the axis 66 of the shutter 52.

More specifically, in embodiments shown in FIGS. 6 and 8A, the body 68 includes a housing 70 that opens into the duct 52, and that houses the shutter 56. The housing 70 only houses the shutter 56, which is mounted on the end of its axis 66, whereby the axis passes through a wall 72 of the housing 70. The housing 70 therefore delimits a cavity in which the shutter 56 can, if the maximum flow position corresponds to the fully-open position of the shutter 56, be entirely retracted inside the housing 70 and in the extension of the walls of the duct 52, as shown by dotted lines in FIG. 6.

As shown in the embodiments of FIGS. 8B and 8D, on the other side of the wall 72, the body 68 comprises an elastic return unit, which is, in this example and not limited thereto, configured in the form of a coil spring 74 with one strip 76 housed in a notch 78 of the body 68, and with another strip 80 housed in a notch 82 of a radial finger 84 that extends radially from the axis 66 of the shutter, so as to generate a return torque around the axis 66. It should be understood that the present disclosure is not limited to this configuration, and that the elastic return unit can be achieved by any other means known to the state of the art, for example with a flexible strip, a balance spring or an elastomer component.

In some embodiments, the body 68 also includes, in a plane that is transverse to the axis 66 of the shutter and intersecting with a radial finger 84, two adjustable stops 86, 88 designed to stop the finger 84, thereby defining two extreme angular positions of the axis 66, associated with the minimum flow and maximum flow positions of the shutter 56. As shown in FIG. 8B, the stops 86, 88 are, for example, in the form of screws housed in a threading (not shown) of the body 68 of the scoop 38 and that can be more or less screwed into the threading in order to define the positions of the heads 90, 92 of these screws 86, 88 protruding from the body 68. The screws can be secured in this position by locknuts 94, 96. FIG. 8B shows, for example, the finger 84 stopped against the head 92 of the stopper screw 88. Therefore, the adjustment of the position of the heads 90, 92 defines the stroke of the radial finger 84, and thereby defines the angular stroke of the axis 66 and of the shutter 56 between the two extreme mechanical fully-closed or fully-open positions. It is therefore possible to change the leakage rate value, as it is possible to change the maximum flow position.

Finally, the axis 66 comprises, at its free end, an imprint 90 by which it is coupled to a rotating actuator (not shown) that drives it rotationally.

It should therefore be understood that in some embodiments, the radial finger 84, the adjustable stops 86, 88 and the actuator are located outside the housing 70, on the other side of the wall 72.

As has been described, in some embodiments the scoop 38 is placed in the secondary flow path 16, whereby it is located in the extension of a wall delimiting the flow path. In one embodiment of the present disclosure, as seen in FIGS. 3 to 5, the turbomachine includes, among its radial arms, at least one aerodynamic arm 98 which is included radially between its external secondary flow annular casing (not shown) and/or its secondary flow guiding nacelle on one hand, and its internal secondary flow annular casing 34 on the other hand. This aerodynamic arm 98 extends axially towards a structural radial arm 31 that corresponds to the intermediary casing 26 and is arranged in the axial extension of the structural arm 31. For example, the turbomachine has six structural radial arms 31 distributed with a spacing of 60 degrees, and a single aerodynamic arm 98 associated with the structural radial arm 31 and oriented vertically, for example, towards the top of the turbomachine, and therefore described as "12 o'clock arm". This aerodynamic arm 98 is, for example, dedicated to auxiliary comprises, such as oil lines, fuel lines, air lines, or other comprises. In the case of an aerodynamic arm oriented towards the bottom of the turbomachine, and therefore described as "6 o'clock arm", the arm could be connected to a power transmission radial shaft.

The aerodynamic arm 98 is, for example, made of two walls 100, 102, seen in FIGS. 3 and 5, that extend in radial and axial directions, and that define an aerodynamic profile.

At the junction between the aerodynamic arm 98 and the structural radial arm 31 of the intermediary casing 31, these two walls 100, 102 define a housing 104 that houses the scoop 38. The wall 50 of the scoop 38 is oriented radially and is located in the extension of the wall 106 of the structural radial arm 31 of the intermediary casing 26 and of the wall 100 of the aerodynamic arm 98, thereby generating very limited resistance to the cold air flow F2.

In some embodiments, the wall 50 of the scoop extends in the entire radial dimension of the aerodynamic arm 98, i.e. between the internal secondary flow annular casing 34 and the external secondary flow casing and/or the guiding nacelle of the turbomachine (not shown in FIGS. 3 to 5).

The positioning of the scoop 38 in the extension of the structural radial arm 31 and the aerodynamic arm 98 is particularly advantageous in that it provides a scoop 38 that is located in a section of the cold air flow F2 that is not subject to boundary layer effects associated with the wall of the secondary flow path 16. The air inlet 42 of the scoop 38 is therefore capable of receiving a cold air flow F2 at maximum speed, which ensures optimal cooling of the casing of the turbine.

More generally and advantageously, the scoop 38 can be located in a global axial position at the level of the radial arms 31, 98, with its wall 50 arranged in the extension of the wall of the secondary flow path 16. The described scoop extends in a globally radial direction, but in another version (not shown) it can be located between the arms and arranged in the extension of an annular wall of the secondary flow path.

The principles, representative embodiments, and modes of operation of the present disclosure have been described in the foregoing description. However, aspects of the present disclosure, which are intended to be protected, are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure as claimed.

The embodiments of the invention in which an exclusive property or privilege is claimed are defined as follows:

1. A dual-flow turbomachine, comprising:
a secondary air flow path arranged around a primary air flow path;
a cooling and turbine clearance control system located in said primary air flow path;
an air inlet scoop having an air inlet and an air outlet, the air inlet scoop supplying said turbine clearance control system with air and configured to take air from the secondary air flow path through the air inlet located in said scoop, wherein the air inlet scoop includes a wall positioned along the secondary flow path in an extension of a wall of the secondary flow path, and wherein the air inlet is formed in and flush with said wall of the air inlet scoop,
wherein said scoop further includes a body in which is formed a duct connecting the air inlet to the outlet of said scoop, the outlet being formed in a base of the scoop and configured to allow the connection of said scoop to said cooling and clearance control system; and
an air flow control shutter is located inside said duct, in the vicinity of said air inlet,
wherein the shutter is assembled in the duct and configured to be movable from a minimum flow position, in which the shutter creates the biggest obstruction in a plane that is transverse to the cross section of the duct, to a maximum flow position, in which the shutter creates the smallest obstruction in said plane that is transverse to the cross section of the duct,
wherein the shutter is mounted for movement about a pivot defining a pivot axis that is transverse to the direction of the duct, and wherein the shutter is elastically returned to its minimum flow position by an elastic return inserted between the body of said scoop and the pivot axis of said shutter, wherein the body includes, in a plane that is transverse to the pivot axis of the shutter and intersecting with a radial finger associated with the shutter, two adjustable stops designed to stop the radial finger, thereby defining two extreme angular positions associated with the minimum flow and maximum flow positions of the shutter, and
wherein the body contains a housing that opens in the duct and houses the shutter, the pivot of the shutter passing through a wall of said housing, and wherein the elastic return, the radial finger, and the adjustable stops are arranged outside said housing.

2. The dual-flow turbomachine of claim 1, wherein the shutter comprises an area that is smaller than the surface of the cross section of the duct in a plane that is transverse to the cross section of the duct, thereby defining a non-zero minimum flow that is called leakage rate.

3. The dual-flow turbomachine of claim 2, wherein said scoop include a rotating actuator coupled to the shutter and arranged outside said housing.

4. The dual-flow turbomachine of claim 1, wherein the turbomachine is oriented along an axis A and includes the secondary air flow path that is externally delineated, in the general flow direction of the air from upstream to downstream along the axis, by an outer shroud of an intermediary annular casing that supports a casing of a ducted fan and one of an annular external casing or a guiding nacelle of the secondary flow assembled to said outer shroud, and internally delineated, in the general flow direction of the air from upstream to downstream along the axis, by an inner shroud of said intermediary annular casing and an annular internal casing for the secondary flow, assembled to said inner shroud, wherein said intermediary annular casing comprises radial arms connecting at least the outer and inner shrouds and the turbomachine.

5. The dual-flow turbomachine of claim 4, wherein the radial arms include structural radial arms each having radial walls, the structural radial arms connect the outer and inner shrouds of the intermediary annular casing, wherein the turbomachine includes an aerodynamic arm having a wall, the aerodynamic arm being connected to one of said structural arms of said intermediary annular casing and that is arranged radially between one of said external annular casing and guiding nacelle of the secondary flow on one hand, and said annular internal casing of the secondary flow on the other hand, wherein said aerodynamic arm extends axially to the radial arm of the annular intermediary casing and in the axial extension of said radial arm, and wherein the aerodynamic arm includes a housing, at its junction with its structural radial arm of the intermediary casing, that houses the scoop, enabling the wall of said scoop to be oriented radially and flush with the radial wall of the structural radial arm and the wall of said aerodynamic arm.

6. The dual-flow turbomachine of claim 5, wherein the wall of said scoop extends along the entire radial dimension of said aerodynamic arm and said structural radial arm.

* * * * *